(12) United States Patent
Lin

(10) Patent No.: US 8,371,704 B1
(45) Date of Patent: Feb. 12, 2013

(54) DISPLAY UNIT WITH MOVABLE FILTER

(75) Inventor: Jeffrey Lin, Cupertino, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/279,756

(22) Filed: Oct. 24, 2011

(51) Int. Cl.
G02B 27/00 (2006.01)
(52) U.S. Cl. ..................................... 359/613
(58) Field of Classification Search ............... None
See application file for complete search history.

(56) References Cited

U.S. PATENT DOCUMENTS

| 4,834,330 | A | | 5/1989 | Swillinger |
| 5,796,577 | A | | 8/1998 | Ouchi |
| 5,856,819 | A | | 1/1999 | Vossler |
| 5,909,315 | A | * | 6/1999 | Keehn ........................... 359/609 |
| 6,125,525 | A | | 10/2000 | Brock |
| 6,137,548 | A | | 10/2000 | Uchida |
| 6,152,567 | A | | 11/2000 | LaForgia |
| 6,469,752 | B1 | | 10/2002 | Ishikawa |
| 6,731,416 | B2 | * | 5/2004 | Hazzard ........................... 359/24 |
| 7,016,183 | B2 | | 3/2006 | Takemoto |
| 7,266,176 | B2 | | 9/2007 | Allison et al. |
| 7,466,306 | B2 | | 12/2008 | Connor |
| 7,545,341 | B2 | | 6/2009 | Brask |
| 7,688,281 | B2 | | 3/2010 | Watanabe |
| 7,688,282 | B2 | | 3/2010 | Motoe |
| 7,903,080 | B2 | | 3/2011 | Yuuki |
| 2004/0150584 | A1 | | 8/2004 | Chuman |
| 2005/0094362 | A1 | | 5/2005 | Stephens |
| 2006/0198088 | A1 | * | 9/2006 | Anderson et al. ............ 361/681 |
| 2007/0024605 | A1 | | 2/2007 | Motoe |
| 2007/0030633 | A1 | | 2/2007 | Tseng |
| 2007/0097048 | A1 | | 5/2007 | Watanabe |
| 2007/0121020 | A1 | | 5/2007 | Ichimura |
| 2007/0253065 | A1 | | 11/2007 | Doczy et al. |
| 2011/0051327 | A1 | * | 3/2011 | Yang et al. ............... 361/679.01 |
| 2011/0216415 | A1 | * | 9/2011 | Engblom et al. ............ 359/609 |

OTHER PUBLICATIONS

Non-Final Office Action for U.S. Appl. No. 13/247,967, mailed Jun. 14, 2012, 10 pages.
Non-Final Office Action for U.S. Appl. No. 13/247,967, mailed Jan. 17, 2012, 9 pages.

* cited by examiner

Primary Examiner — Derek S Chapel
(74) Attorney, Agent, or Firm — Brake Hughes Bellermann LLP

(57) ABSTRACT

An electronic device includes a display unit and a filter. The display unit is configured to provide a visual display to a user of the device. The display unit has a first side portion and a second side portion. The filter is configured to alter a viewer's perception of the visual display. The filter is pivotally coupled to the display unit. The filter is configured to pivot from a first position adjacent the first side portion of the display unit to a second position adjacent the second side portion of the display unit.

13 Claims, 5 Drawing Sheets

DISPLAY UNIT WITH MOVABLE FILTER

TECHNICAL FIELD

This description relates a display unit, such as a display unit of a laptop computer, that includes a movable filter.

BACKGROUND

Electronic devices that include display units that produce visual outputs, such as laptop computers, are frequently used in public places. The visual outputs generated from such device may be private or confidential and the intended recipient of the visual output of device (such as the user of the device) may not want others to view the visual output. Additionally, the visual output may be disruptive to those not using the device.

Filters, such as privacy filters, are used to limit or dampen the visual output produced by electronic devices. For example, a user of an electronic device may place a privacy filter proximate a display unit of an electronic device when the user desires to limit the range or projection angle of the visual output. According, the visual output may be limited so as to limit the number of unintended recipients. Some filters are configured to be coupled to the electronic device such that the filter is disposed adjacent the display unit. However, known electronic devices do not include a storage location to place the filter when the user desires to use the electronic device without the use of the filter.

Thus, it is desirable to provide an electronic device that includes a filter that may be moved from a first position for use and a second position for storage.

SUMMARY

In one implementation, a device includes a display unit and a filter. The display unit is configured to provide a visual display to a user of the device. The display unit has a first side portion and a second side portion. The filter is pivotally coupled to the display unit. The filter is configured to pivot from a first position adjacent the first side portion of the display unit to a second position adjacent the second side portion of the display unit.

In one implementation, a device includes a display unit, a filter, and a hinge member. The display unit is configured to provide a visual display to a user of the device. The display unit has a first side portion and a second side portion. The hinge member has a first portion coupled to the display unit and a second portion coupled to the filter. The filter is configured to pivot from a first position to a second position. The filter is disposed adjacent the first side portion of the display unit when the filter is in its first position. The filter is disposed adjacent the second side portion of the display unit when the filter is in its second position.

In another implementation, a device includes a display unit and a hinge member. The display unit is configured to provide a visual display to a user of the device. The hinge member has a first portion coupled to the display unit and a second portion. The second portion of the hinge member is configured to be coupled to a filter such that the filter may move from one position with respect to the display unit to another position with respect to the display unit.

In another implementation, a method of storing a filter, includes grasping the filter and pivoting the filter from a first position to a second position, the filter being disposed adjacent a first side portion of a display unit when the filter is in its first position, the filter being disposed adjacent a second side portion of the display unit when the filter is in its second position.

DETAILED DESCRIPTION

Figure 1:
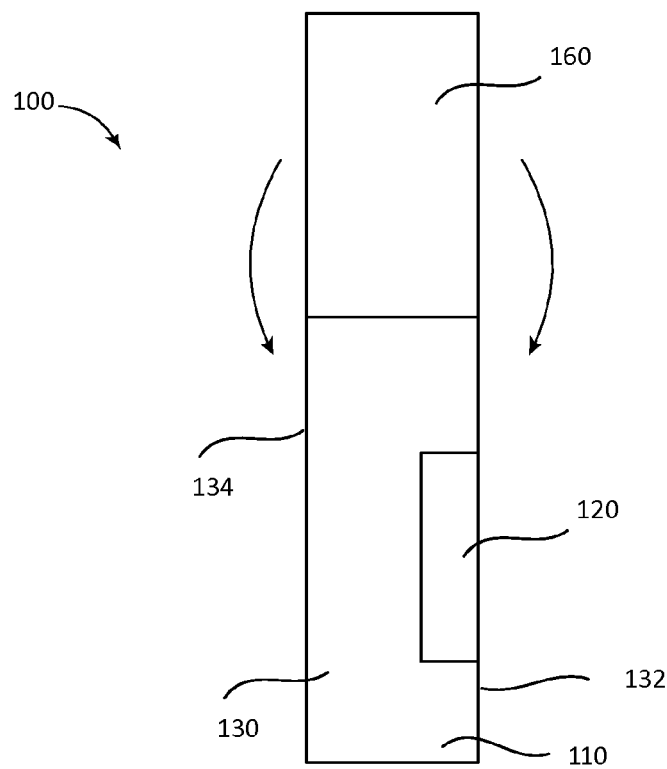
FIG. 1 is a schematic diagram of an example device according to an implementation.

FIG. 1 is a schematic diagram of a device 100. The device 100 may be any type of device that is configured to produce or emit a visual output, such as an electronic device that produces or emits an electronic visual output. For example, in some implementations, the device 100 is a computer, such as a laptop computer. In other implementations, the device 100 is another type of computing device such as a tablet. In yet other implementations, the device 100 is another device that is configured to produce or emit a visual output. In some implementations, the device 100 is portable. In other words, in some implementations, the device 100 is sized such that a user may carry or easily transport the device 100. In other implementations, the device 100 is not easily portable and is configured to remain in a single location. In other words, in such implementations, the device 100 is sized such that it is too large or too heavy for a user to easily carry or transport the device 100.

The device 100 includes a display unit 110 and an input unit 115. The input unit 115 may be any type of mechanism that is configured to receive an input from a user, such as a keyboard or other mechanism. The display unit 110 includes a display member 120 and a housing 130. In some implementations, the display unit 110 is an electronic display unit.

The housing 130 of the display unit 110 has a first side portion 132 and a second side portion 134. In some implementations, the first side portion 132 is disposed opposite the second side portion 134.

In some implementations, the housing 130 is formed of a single piece of material or from a single molding process. In other implementations, the housing 130 is formed by coupling a plurality of pieces of material together.

The display member 120 is configured to provide a visual output to a user. For example, in some implementations, the display member 120 is a computer screen or display. In other implementations, the display member 120 is another device that provides a visual output or display to a user.

In the illustrated implementations, the display member 120 is coupled to or disposed at the first side portion 132 of the housing 130. For example, in some implementations, the first side portion 132 extends around or frames the display member 120.

The device 100 includes a filter 160. The filter 160 is coupled to the display unit 110. For example, in some implementations, the filter 160 is coupled to the housing 130 of the display unit 110. The filter 160 is coupled to the display unit 110 such that it may move from a first position with respect to the display unit 110 to a second position with respect to the display unit 110 different than the first position. When the filter 160 is in its first position, the filter 160 may be positioned such that it is disposed adjacent the first side portion 132. For example, the filter 160 may be positioned adjacent the display member 120 (such that the filter 160 is disposed between the display member 120 and a user of the device 100) when the filter 160 is in its first position. The filter 160 may be positioned such that it is disposed adjacent the second side portion 134 when the filter 160 is in its second position.

In some implementations, the filter 160 is pivotally or rotatably coupled to the display unit 110 and the filter 160 is configured to pivot or rotate from its first position to its second position. For example, in some implementations, the device 100 includes a hinge member disposed between the filter 160 and the display unit 110 that is configured to allow the filter to pivot or rotate with respect to the display unit 110.

The hinge member may have a first portion coupled to the display unit 120 and a second portion coupled to the filter 160. The first and second portions of the hinge member may be configured to pivot or move with respect to each other to allow the filter 160 to pivot or rotate with respect to the display unit 110. In some implementations, the first portion of the hinge member may be unitarily or monolithically formed with the housing 130 or the display unit 110 and the second portion of the hinge member may be unitarily or monolithically formed with the filter 160. For example, the first portion of the hinge member may be molded to or with the housing 130 or the display unit 110 and the second portion of the hinge member may be molded to or with a portion of the filter 160, such as a frame portion of the filter 160. A pin or other elongate member may extend through a portion of each of the first portion of the hinge member and the second portion of the hinge member to pivotally or movably couple the first portion of the hinge member to the second portion of the hinge member.

In some implementations, the hinge member is a living hinge member. In such implementations, the hinge member is coupled to the housing 130 or display unit 110 and to the filter 160 and includes a flexible portion or a portion formed of a flexible material. The flexible portion of the living hinge member is configured to allow the filter 160 to pivot or rotate with respect to the display unit 110.

In some implementations, the hinge member is disposed along an upper or top edge of the housing 130 or display unit 110. In such implementations, the filter 160 pivots or moves over the top of the housing 130 or display unit 110 when it moves from its first position to its second position. In other implementations, the hinge member is disposed along a side edge portion of the housing 130 or display unit 110. In such implementations, the filter 160 pivots or moves around a side of the housing 130 or display unit 110 when it moves from its first position to its second position. In yet other implementations, the hinge member is disposed at a different location on the housing 130 or display unit 110.

In some implementations, the hinge member includes a first portion that is coupled to the housing 130 or the display unit 110 and a second portion. The second portion of the hinge member may be coupled to the filter 160. For example, in some implementations, second portion of the hinge member is configured to be removably coupled to the filter 160.

In some implementations, the device 100 includes a first coupling member disposed on the first side portion 132. The first coupling member is configured to engage the filter 160 or a portion of the filter 160 when the filter 160 is in its first position to help retain the filter 160 in its first position. For example, the first coupling member may be a projection, a tab member, a snap member, or any other member that is configured to engage a portion of the filter 160. The engagement of the first coupling member helps retain the filter 160 in its first position. The first coupling member may be disengaged from the filter 160 when the filter 160 is moved to its second position. In some implementations, the first coupling member is coupled to the first side portion 132, such as a surface of the first side portion 132, via glue or another adhesive. In other implementations, the first coupling member is unitarily or monolithically formed (such as via molding) with the housing 130 or display unit 110.

In some implementations, the device 100 includes a second coupling member disposed on the second side portion 134. The second coupling member is configured to engage the filter 160 or a portion of the filter 160 when the filter 160 is in its second position to help retain the filter 160 in its second position. For example, the second coupling member may be a projection, a tab member, a snap member, or any other member that is configured to engage a portion of the filter 160. The engagement of the second coupling member helps retain the filter 160 in its second position. The second coupling member may be disengaged from the filter 160 when the filter 160 is moved to its first position. In some implementations, the second coupling member is coupled to the first side portion 132, such as a surface of the first side portion 132, via glue or another adhesive. In other implementations, the second coupling member is unitarily or monolithically formed (such as via molding) with the housing 130 or display unit 110.

The filter 160 is configured to modify or adjust the visual output of the display member 120. For example, in some implementations, the filter 160 is configured to be disposed between the display member 120 and a user of the device 100 to modify the visual output of the display member 120 as it is received by the user. In some implementations, the filter 160 is configured to alter a viewer's perception of the visual display.

In some implementations, the filter 160 is a privacy filter. For example, in some implementations, the filter 160 is configured to limit the viewing angle of the display member 120. In other words, in some implementations, the filter 160 is configured to limit or narrow the angle at which the display member 120 may be viewed. In such implementations, the filter 160 is configured to narrow the viewing angle (or the angle at which the display member 120 may be viewed by a user and still receive the output of the display member 120) such that only people disposed directly or substantially directly in front of the display member 120 may receive the visual output provided by the display member 120. For example, in some implementations, the filter 160 is a privacy filter that is configured to limit the viewing angle to within 20 degrees from a direction normal to the surface of the display (or the surface of the portion of the device that is providing the display to the user). In other implementations, the filter is configured to limit the viewing angle to within 10 degrees or less than 10 degrees from a direction normal to the surface of the display.

In other implementations, the filter 160 is configured to dim, soften, or otherwise modify the output of the display member 120. In yet other implementations, the filter 160 is another type of filter, such as an enhancement filter that is configured to enhance or otherwise modify the output of the display member 120.

In some implementations, the second side portion 134 of the housing 130 may include a display item. For example, a symbol, shape, letter, word, or other character may be disposed on a surface of the second side portion 134 of the housing 130. In some implementations, the filter 160 is configured to alter the perception of the display item when the filter 160 is coupled to the second side portion 134 of the housing 130. For example, in some implementations, the display item may have a first color when viewed without the filter and may be of a second color when viewed through the filter. In other implementations, the display item or a portion of the display item may become visible when viewed through the filter (and is not visible when viewed without the filter).

In some implementations, the filter 160 includes a screen and a frame. In such implementations, the screen may be configured to modify or adjust the visual output of the display member 120. The frame may be configured to provide support to the screen and may provide a grasping location for the user. Thus, the user may grasp or otherwise handle the filter 160 using the frame so as to avoid touching the screen (and potentially making the screen dirty). Additionally, the frame or a portion of the frame may be configured to engage the first and second coupling members to help removably couple the filter 160 to the housing 130 in its first and second positions, respectively.

In some implementations, the device includes an input unit. In some implementations, the input unit extends from or is disposed adjacent the first side portion 132 of the housing 130. In such implementations, a user may be able to interact with the input unit while viewing the output of the display member 120. In some implementations, the input unit is configured to wirelessly communicate with the display unit 110.

In some implementations, the filter 160 may be placed in or at its first position when the user of the device 100 intends to use the filter (view the display of the display member 120 through the filter 160). The user may pivot or rotate the filter 160 to its second position when the user of the device 100 intends to store the filter 160 (or view the display of the display member 120 without the use of the filter 160). In some implementations, the filter 160 may be disposed in openings or receiving portions of the first side portion 132 and the second side portion 134 when the filter 160 is in its first and second positions, respectively. In such implementations, the device 100, such as a laptop computer, may be collapsed and transported while the filter 160 is in either its first or second positions.

FIGS. 2-5 illustrate a device 200 according to an implementation of the invention. The device 200 is a laptop computer that provides a visual output. The device 200 includes a display unit 210 and an input unit 215. The input unit 215 may be any type of mechanism that is configured to receive an input from a user, such as a keyboard or other mechanism. The display unit 210 includes a display member 220 and a housing 230.

The housing 230 or the display unit 210 has a first side portion 232 and a second side portion 234. The first side portion 232 is disposed opposite the second side portion 234. In other words, the first side portion 232 faces a direction that is opposite the direction that the second side portion 234 faces.

In some implementations, the housing 230 is formed of a single piece of material or from a single molding process. In other implementations, the housing 230 is formed by coupling a plurality of pieces of material together.

The display member 220 is configured to provide a visual output to a user. Specifically, the display member 220 is a computer screen or display. The display member 220 is coupled to or disposed at the first side portion 232 of the housing 230. Specifically, the first side portion 232 extends around or frames the display member 220.

Figure 2:
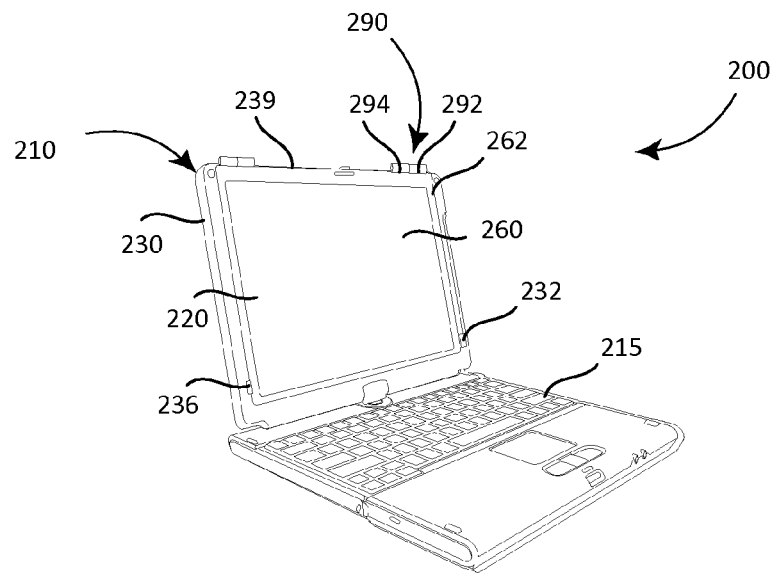
FIG. 2 is a perspective view of a device according to an implementation with the filter in a first position.
Figure 3:
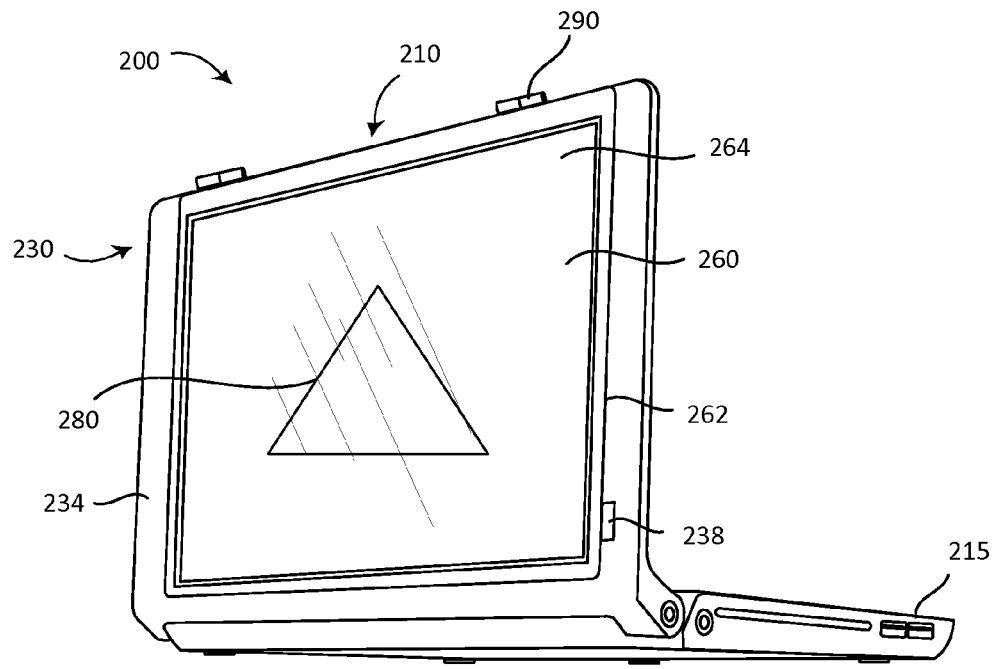
FIG. 3 is a perspective view of the device of FIG. 2 with the filter in a second position.
Figure 4:
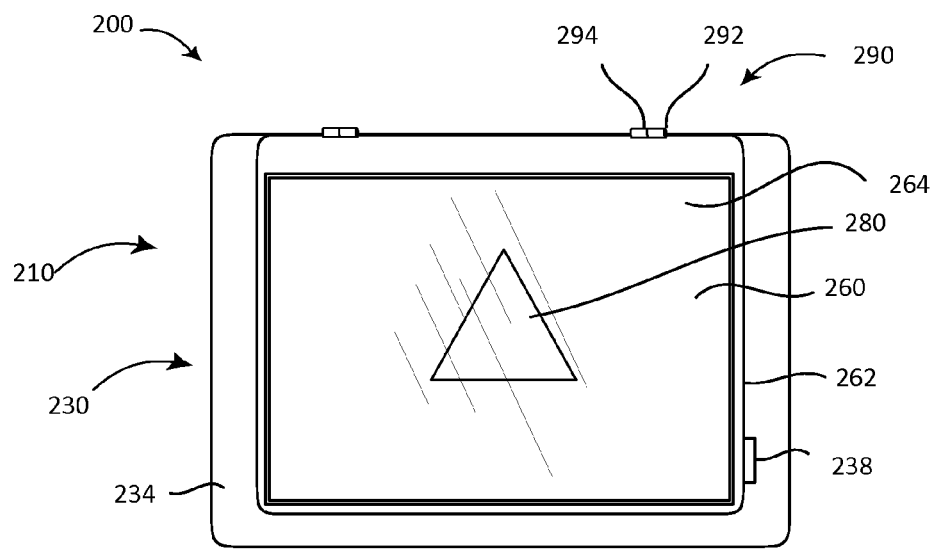
FIG. 4 is a rear view of the device of FIG. 2 with the filter in its second position.

The device 200 includes a filter 260. The filter 260 is coupled to the display unit 210. Specifically, the filter 260 is coupled to the housing 230 of the display unit 210. The filter 260 is coupled to the display unit 110 such that it may move from a first position with respect to the display unit 210 to a second position with respect to the display unit 210 different than the first position. As best illustrated in FIG. 2, when the filter 260 is in its first position, the filter 260 is positioned such that it is disposed adjacent the first side portion 232. Specifically, the filter 260 is positioned adjacent the display member 220 (such that the filter 260 is disposed between the display member 220 and a user of the device 200) when the filter 260 is in its first position. As best illustrated in FIGS. 3 and 4, the filter 260 may be positioned such that it is disposed adjacent the second side portion 234 when the filter 260 is in its second position.

The filter 260 is pivotally or rotatably coupled to the display unit 210 and the filter 260 is configured to pivot or rotate from its first position to its second position. The device 200 includes a hinge member 290 disposed between the filter 260 and the display unit 210 that is configured to allow the filter 260 to pivot or rotate with respect to the display unit 210.

The hinge member 290 has a first portion 292 coupled to the display unit 220 and a second portion 294 coupled to the filter 260. The first portion 292 and second portion 294 of the hinge member 290 are configured to pivot or move with respect to each other to allow the filter 260 to pivot or rotate with respect to the display unit 210. In the illustrated implementation, the first portion 292 of the hinge member 290 is unitarily or monolithically formed with the housing 230 or the display unit 210 and the second portion 294 of the hinge member 290 is unitarily or monolithically formed with the filter 260.

Figure 5:
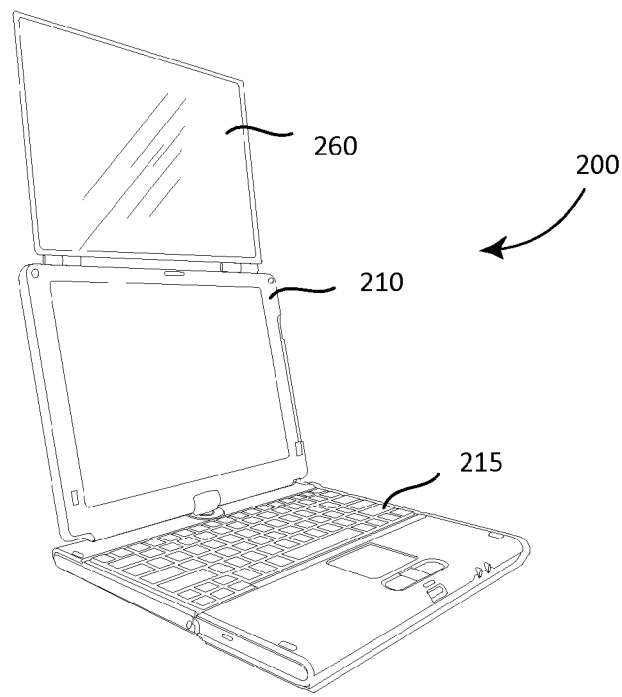
FIG. 5 is a perspective view of the device of FIG. 2 with the filter in a third position.

The hinge member 290 is disposed along an upper or top edge 239 of the housing 230 or display unit 210. As best illustrated in FIG. 5, the filter 260 pivots or moves over the top of the housing 230 or display unit 210 when it moves from its first position to its second position (and can be placed in a third position with respect to the display unit 210, as illustrated in FIG. 5).

The device 200 includes a first coupling member 236 disposed on the first side portion 232. The first coupling member 236 is configured to engage the filter 260 or a portion of the filter 260 when the filter 260 is in its first position to help retain the filter 260 in its first position. The first coupling member 236 is a tab member that is configured to engage a portion of the frame 262 of the filter 260. The engagement of the first coupling member 236 helps retain the filter 260 in its first position. The first coupling member 236 may be disengaged from the filter 260 when the filter 260 is moved to its second position. For example, the first coupling member 236 may be configured to flex or bend to engage or disengage the filter 260.

The device 200 includes a second coupling member 238 disposed on the second side portion 234. The second coupling member 238 is configured to engage the filter 260 or a portion of the filter 260 when the filter 260 is in its second position to help retain the filter 260 in its second position. The second coupling member 268 is a tab member that is configured to engage the frame 262 of the filter 260. The engagement of the second coupling member 238 helps retain the filter 260 in its second position. The second coupling member 238 may be disengaged from the filter 260 when the filter 260 is moved to its first position.

The filter 260 is configured to modify or adjust the visual output of the display member 220. For example, in some implementations, the filter 260 is configured to be disposed between the display member 220 and a user of the device 200 to modify the visual output of the display member 220 as it is received by the user.

In some implementations, the filter 260 is a privacy filter. For example, in some implementations, the filter 260 is configured to limit the viewing angle of the display member 220. In other words, in some implementations, the filter 260 is configured to limit or narrow the angle at which the display member 220 may be viewed. In such implementations, the filter 260 is configured to narrow the viewing angle (or the angle at which the display member 220 may be viewed by a user and still receive the output of the display member 220) such that only people disposed directly or substantially directly in front of the display member 220 may receive the visual output provided by the display member 220. In other implementations, the filter 260 is configured to dim, soften, or otherwise modify the output of the display member 220. In yet other implementations, the filter 260 is another type of filter, such as an enhancement filter that is configured to enhance or otherwise modify the output of the display member 220.

The second side portion 234 of the housing 230 includes a display item 280. The display item 280 may be a symbol, a shape, a letter, a word, or other character. In some implementations, the filter 260 is configured to alter the perception of the display item 280 when the filter 260 is coupled to the second side portion 234 of the housing 230. For example, in some implementations, the display item 280 may have a first color when viewed without the filter 260 and may be of a second color when viewed through the filter 260. In other implementations, the display item 280 or a portion of the display item 280 may become visible when viewed through the filter 260 (and is not visible when viewed without the filter 260). Specifically, in some implementations, the polarity of the display item 280 is different than the polarity of the filter 260 to cause the display item 280 to appear differently when viewed through the filter 260.

The filter 260 includes a screen 264 and a frame 262. In such implementations, the screen 264 may be configured to modify or adjust the visual output of the display member 220. The frame 262 may be configured to provide support to the screen and may provide a grasping location for the user. Thus, the user may grasp or otherwise handle the filter 160 using the frame so as to avoid touching the screen (and potentially making the screen dirty). The frame 262 may also help prevent bending or warping of the screen 264. Additionally, the frame 262 or a portion of the frame 262 is configured to engage the first and second coupling members 236 and 238 to help removably couple the filter 260 to the housing 230 in its first and second positions, respectively. For example, in some implementations, the frame 262 includes grooves or indents that are configured to engage the coupling members 236 and 238.

In some implementations, the device 200 includes an input unit 215. A user may interact with the input unit 215 while viewing the output of the display member 220. In some implementations, the input unit 215 is configured to wirelessly communicate with the display unit 210.

In some implementations, the filter 260 may be placed in or at its first position when the user of the device 200 intends to use the filter (view the display of the display member 220 through the filter 260). The user may pivot or rotate the filter 260 to its second position when the user of the device 200 intends to store the filter 260 (or view the display of the display member 220 without the use of the filter 260). In some implementations, the filter 260 may be disposed in openings or receiving portions of the first side portion 232 and the second side portion 234 when the filter 260 is in its first and second positions, respectively. In such implementations, the device 200, a laptop computer, may be collapsed and transported while the filter 260 is in either its first or second positions.

FIGS. 6-9 illustrate a device 300 according to another implementation. The device 300 is a laptop computer that provides a visual output to a user. The device 300 includes a display unit 310 and an input unit 315. The display unit 310 includes a display member 320 and a housing 330.

The housing 330 or the display unit 310 has a first side portion 332 and a second side portion 334. The first side portion 332 is disposed opposite the second side portion 334.

Figure 6:
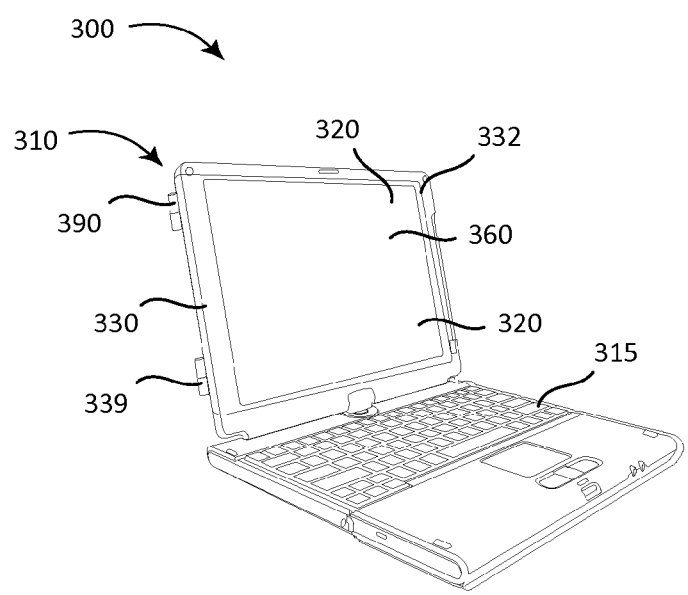
FIG. 6 is a perspective view a device according to an implementation with the filter in a first position.
Figure 7:
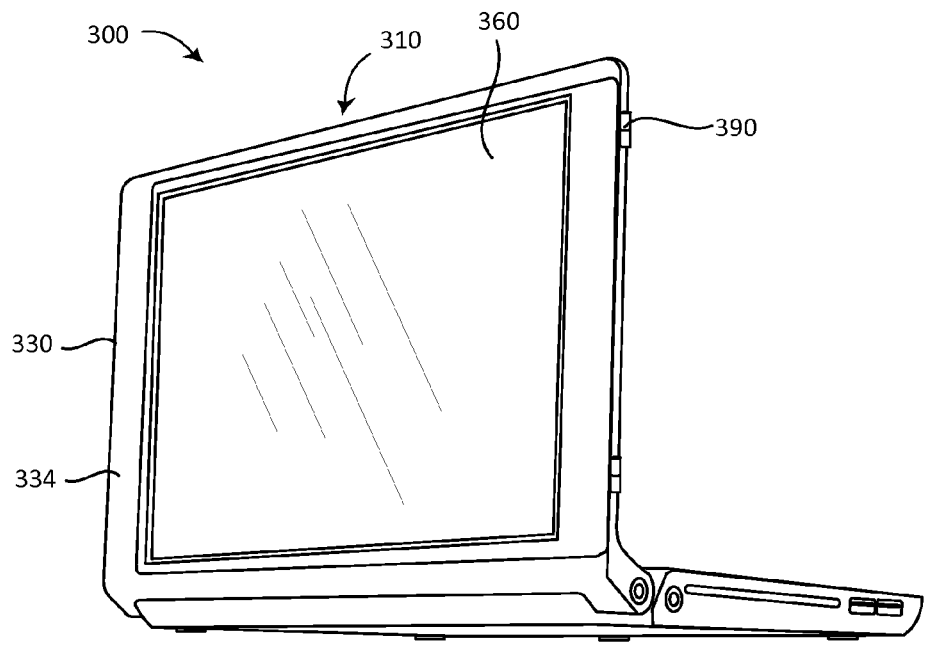
FIG. 7 is a perspective view of the device of FIG. 6 with the filter in a second position.
Figure 8:
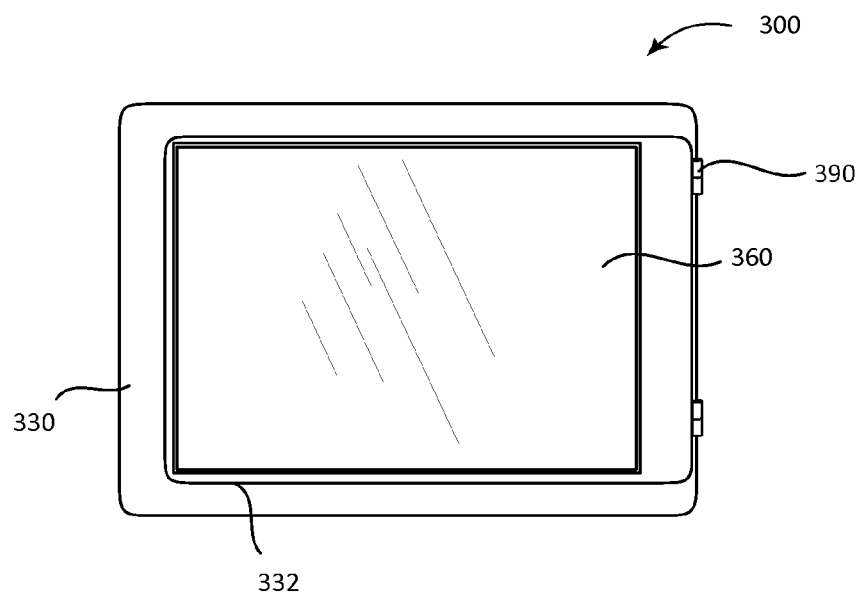
FIG. 8 is a rear view of the device of FIG. 6 with the filter in its second position.
Figure 9:
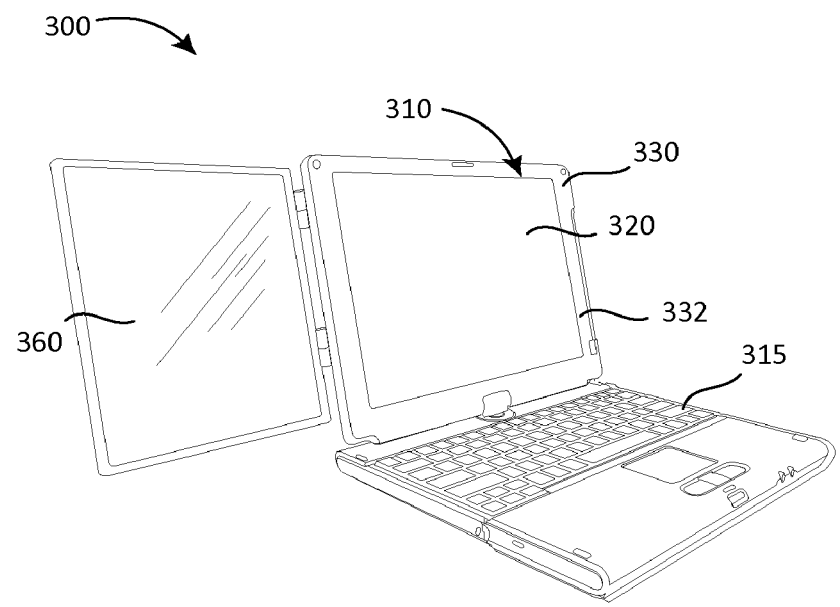
FIG. 9 is a perspective view of the device of FIG. 6 with the filter in a third position.

The device 300 also includes a filter 360. The filter 360 is pivotally coupled to the display unit 310 such that the filter 360 may move from a first position adjacent the first side portion 332 of the housing 330 (as illustrated in FIG. 6) to a second position adjacent the second side portion 334 of the housing 330 (as illustrated in FIGS. 7 and 8). FIG. 9 illustrates the filter 360 in a third position between the first position and the second position.

A hinge member 390 pivotally or rotatably couples the filter 360 to the display unit 310 or housing 330. The hinge member 390 is disposed along a side edge portion 339 of the display unit 310 or housing 330. The filter 360 may be swung or moved around a side of the display unit 310 or housing 330 to move the filter 360 from its first position to its second position.

The hinge member 390 extends along only a portion of the side edge portion of the display unit 310 or housing 330. In the illustrated implementation, the device 300 includes a pair of hinge members. In other implementations, the device includes a different number of hinge members. For example, in some implementations, a single hinge member may extend along the entire length of the side edge (or along an entire top edge) of the display unit or housing.

Figure 10:
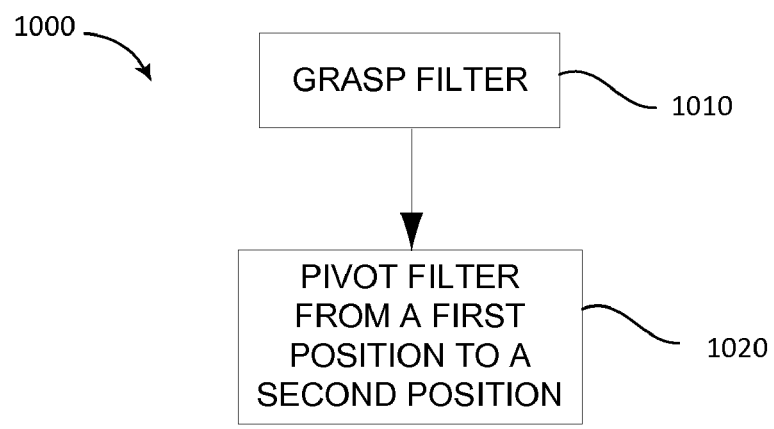
FIG. 10 is a flow chart illustrating a method of moving a filter from a first position to a second position.

FIG. 10 is a flow chart that illustrates a method 1000 according to an implementation. The method includes at 1010 grasping a filter. In some implementations, the grasping includes grasping a frame portion of the filter.

In some implementations, a user may grasp the filter at a frame portion of the filter so as to avoid contacting and potentially making a screen portion of the filter dirty. In some implementations, the user may use a hand of the user to grasp the filter.

At 1020, the user may rotate or pivot the filter with respect to the display unit from a first position to a second position. In some implementations, the method includes decoupling a portion of the filter, such as a frame of the filter, from a coupling member prior to the rotating or pivoting.

In some implementations, the method 1000 includes coupling the filter, or a portion of the filter, such as the frame, to a coupling member after the rotating or pivoting of the filter to its second position.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A computing device, comprising:
    an electronic display unit configured to provide a visual display to a user of the device, the display unit having a first side portion and a second side portion;
    a filter configured to alter a viewer's perception of the visual display, the filter being pivotally coupled to the display unit, the filter being configured to pivot from a first position adjacent the first side portion of the display unit to a second position adjacent the second side portion of the display unit;
    a first coupling member configured to engage the filter when the filter is in its first position to help retain the filter in its first position;
    a second coupling member configured to engage the filter when the filter is in its second position to help retain the filter in its second position; and
    wherein the first side portion is disposed opposite the second side portion.

2. The device of claim 1, wherein the display unit includes a display member that is configured to provide the visual display, the display member being disposed on the first side portion of the display unit.

3. The device of claim 1, wherein the filter is a privacy filter.

4. The device of claim 1, wherein the filter includes a frame portion and a screen portion.

5. The device of claim 1, further comprising:
    a hinge member having a first portion coupled to the filter and a second portion coupled to the display unit.

6. A device, comprising:
    a display unit configured to provide a visual display to a user of the device, the display unit having a first side portion and a second side portion;
    a filter;
    a hinge member, the hinge member having a first portion coupled to the display unit and a second portion coupled to the filter;
    the filter being configured to pivot from a first position to a second position, the filter being disposed adjacent the first side portion of the display unit when the filter is in its first position, the filter being disposed adjacent the second side portion of the display unit when the filter is in its second position;
    a first coupling member configured to engage the filter when the filter is in its first position to help retain the filter in its first position;
    a second coupling member configured to engage the filter when the filter is in its second position to help retain the filter in its second position; and
    wherein the first side portion is disposed opposite the second side portion.

7. The device of claim 6, wherein the hinge member is a living hinge member.

8. The device of claim 6, wherein the display unit includes a display member that is configured to provide the visual display, the display member being disposed on the first side portion of the display unit.

9. The device of claim 6, wherein the filter is a privacy filter that is configured to restrict the ability of a viewer to view the visual display to a range of angles within 20 degrees of a direction normal to a surface of the display unit on which the visual display is presented.

10. The device of claim 6, wherein the filter includes a frame portion and a screen portion.

11. A device, comprising:
    a display unit having an upper surface and configured to provide a visual display to a user of the device;
    a hinge member, the hinge member having a first portion coupled to the upper surface of the display unit and a second portion, the second portion being configured to be coupled to a filter such that the filter may move from a first position with respect to the display unit to a second position with respect to the display unit;
    wherein the filter is configured to be disposed adjacent a first side portion of the display unit when the filter is in its first position and adjacent a second side portion of the display unit when the filter is in its second position;
    wherein the first side portion is disposed opposite the second side portion;
    a first coupling member configured to engage the filter when the filter is in its first position to help retain the filter in its first position; and
    a second coupling member configured to engage the filter when the filter is in its second position to help retain the filter in its second position.

12. The device of claim 11, wherein the hinge member is configured to allow the filter to pivot from its first position to its second position.

13. The device of claim 11, wherein the display unit includes a display member configured to provide a visual image to a user.

* * * * *